United States Patent
Hohensee et al.

(10) Patent No.: US 7,065,646 B1
(45) Date of Patent: Jun. 20, 2006

(54) REMOTE NOTIFICATION OF PRINT OR FAX HARDCOPY RECIPIENT USING STANDARD IDENTIFICATION DATA

(75) Inventors: Reinhard H. Hohensee, Boulder, CO (US); Harry R. Lewis, Jr., Longmont, CO (US); David E. Stone, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/526,622

(22) Filed: Mar. 16, 2000

(51) Int. Cl.
  *H04L 9/00* (2006.01)

(52) U.S. Cl. .................. 713/168; 713/193; 713/202

(58) Field of Classification Search ........ 709/223–227, 709/203; 710/57; 713/168, 201, 202, 193; 705/64

See application file for complete search history.

(56) References Cited

U.S. PATENT DOCUMENTS

| | | | |
|---|---|---|---|
| 5,127,047 A | 6/1992 | Bell et al. | 358/439 |
| 5,552,901 A | 9/1996 | Kikuchi et al. | 358/442 |
| 5,619,649 A | 4/1997 | Kovnat et al. | 358/1 |
| 5,633,932 A | 5/1997 | Davis et al. | 340/5 |
| 5,638,511 A * | 6/1997 | Nezu | 713/201 |
| 5,644,685 A | 7/1997 | Baehr | 371/298 |
| 5,652,794 A | 7/1997 | Lepetit et al. | 301/108 |
| 5,752,697 A | 5/1998 | Mandel et al. | 270/58 |
| 5,771,101 A | 6/1998 | Bramall | 358/406 |
| 6,272,631 B1 * | 8/2001 | Thomlinson et al. | 713/155 |
| 6,378,070 B1 * | 4/2002 | Chan et al. | 713/155 |
| 6,385,728 B1 * | 5/2002 | DeBry | 726/9 |
| 6,418,420 B1 * | 7/2002 | DiGiorgio et al. | 705/40 |
| 6,477,647 B1 * | 11/2002 | Venkatraman et al. | 713/193 |
| 6,533,171 B1 * | 3/2003 | Porter | 235/380 |
| 6,600,902 B1 * | 7/2003 | Bell | 455/411 |
| 6,615,234 B1 * | 9/2003 | Adamske et al. | 709/203 |
| 6,862,583 B1 * | 3/2005 | Mazzagatte et al. | 705/64 |
| 2002/0019852 A1 * | 2/2002 | Bahar | 709/206 |
| 2002/0104026 A1 * | 8/2002 | Barra et al. | 713/202 |

* cited by examiner

*Primary Examiner*—Christopher Revak
*Assistant Examiner*—Arezoo Sherkat
(74) *Attorney, Agent, or Firm*—Jon A. Gibbons; Fleit, Kain, Gibbons, Gutman, Bongini & Bianco P.L.

(57) ABSTRACT

Personal identifying information is obtained from a person receiving information content via an output device and sent back to the source of the information e.g. the sender. The personal information such as that in VCARD format is entered by the person receiving the document from a smart card or similar device. The system offers confirmation to users of computer communication systems as to the identity of the recipient of information they have transmitted over the system.

14 Claims, 4 Drawing Sheets

REMOTE NOTIFICATION OF PRINT OR FAX HARDCOPY RECIPIENT USING STANDARD IDENTIFICATION DATA

CROSS-REFERENCE TO RELATED APPLICATIONS

Not Applicable.

FIELD OF THE INVENTION

This invention generally relates to collecting personal identifying information from users receiving output at data output devices, and transmitting personal identifying information back to the source of the data. The invention more particularly relates to the use of portable electronic devices entering the personal identifying information which is received at the data output device and sent back to the data source.

BACKGROUND OF THE INVENTION

Current computer networks provide the ability to easily access data stored on multiple computers connected to the network, and to cause the data to be output, e.g., printed, on multiple output devices connected to the network. This versatility also reduces (to some extent) accountability for use of information stored on the system. Data stored on the computer systems can be accessed and outputted (e.g., printed) from multiple physical locations.

A computer network may comprise display terminals, printers, and fax machines, as output devices. The computers in network convert data received into a format appropriate for output devices such as a fax machine.

Although computer networks are useful, there are problems regarding the security of certain information during remote output and the accountability of persons receiving output data. The problems of security and accountability are separate and distinct problems. One known solution to the problem of security during remote data output requires a user ID and password to be entered into a computer before documents are accessed. Once the documents have been accessed, they can be freely sent to an output device, e.g., a printer.

Another solution to the problem of security during remote data output is disclosed in U.S. Pat. No. 5,752,697 by Barry P. Mandel et al. for "Remote Printing Job Confidentiality" issued on May 19, 1998. A system is disclosed in which system electronic print jobs from different users at different locations may be electronically sent to be printed, and hard-copy print jobs are automatically fed into respective selected lockable physical mailboxes. Entry to the physical mailbox is actuated by entry of an authorized jam clearance access code.

Still, another solution to the problem of security during remote data output is disclosed by U.S. Pat. No. 5,633,932 by Derek L. Davis et al. entitled "Apparatus and Method for Preventing Disclosure Through User-Authentication at a Printing Node" issued May 27, 1997. This patent discloses one or more types of security devices, such as smart cards, data entered by the user through a keyboard, and biometric data. Similarly, U.S. Pat. No. 5,771,101 by Roy Bramall for "Data Security System" issued Jun. 23, 1998 discloses a system which records outputted data along with user identification information in a data recording system which may be subsequently accessed to conduct security audits.

In the case of computer systems being used as a communication systems, the transmitted information may include security provisions such as those described above at the receiving end. These security provisions, although useful, do not address the problems of accountability of a person receiving output data. Accordingly, there is a need to provide the identity of the person receiving data.

Also, there is a class of output data or documents which is sensitive in that it is restricted to a range of recipients (within a specific office, for example) but which, due to the environment, would not be a candidate for targeting to a specific individual. Typically, such data, sent to a particular remote output device may be accessed or retrieved by anyone at a respective location without any identification or knowledge of the person retrieving the document. This is especially true where the only security required is access to the restricted area where a particular printer or fax or some other recipient output device may be placed.

Aside from the issue of misappropriation, there are often a variety of business and legal reasons to maintain a record of who has produced an output of certain documents. For example, in a business context, an author or sender of a document may want to have proof that the intended recipient received a document (e.g., a statement of company policies). Such a document does not call for security restrictions. Rather, there is a need to confirm that a specific person output the document, so that it can be known that the recipient had been put on notice as to the information conveyed.

What is needed is a system which determines the identity of a person or persons receiving information output at an output device, and sends that data back to the sender.

What is further needed is a system which collects descriptive data about a person or persons accepting output data at an output device, and conveys the descriptive data back to a party who sent the output data.

What is still further needed is a system which collects descriptive data about a person or persons, accepting output data at an output device, and conveys the descriptive data back to a third party designated by the person outputting the data.

SUMMARY OF THE INVENTION

According to the inventive principles as disclosed in connection with a preferred embodiment, a record may be made showing the party retrieving a document sent to a remote location over a two-way communication system, directly in response to standard identifying information, without the corroboration or verification of a password and without any need for encryption. The invention, according to the inventive principles, may be used with any kind of two way communication system, whether local or world wide through the Internet, and including wireless systems, circuit switched telephone systems, cable or fiber optic systems. Use of the method or system, according to the inventive principles disclosed, allows a record or trail to be established by standard identity data, leading to the party who was the one actually accessing or retrieving a remotely delivered document. This record or trail is particularly useful as it can be used with any document, in any form, whether in a data file such as a word processing file or data base file, spread sheet file, or, without limitation, in any other form, as would be known to those skilled in the art or which may be developed, and whether or not encrypted, encode, or otherwise limited to named identified parties permitted access to the document. The inventive principles may be applied to any remote document delivery system, such as for example, a printer, facsimile, or computer processor having a data store or a display, or any other kind or type of device, capable of receiving information, storing the information, and then displaying the information in a temporary display or in a human readable printed version, and as would be known to those skilled in the art, presently or as may be developed.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF A PREFERRED EMBODIMENT

However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 1:
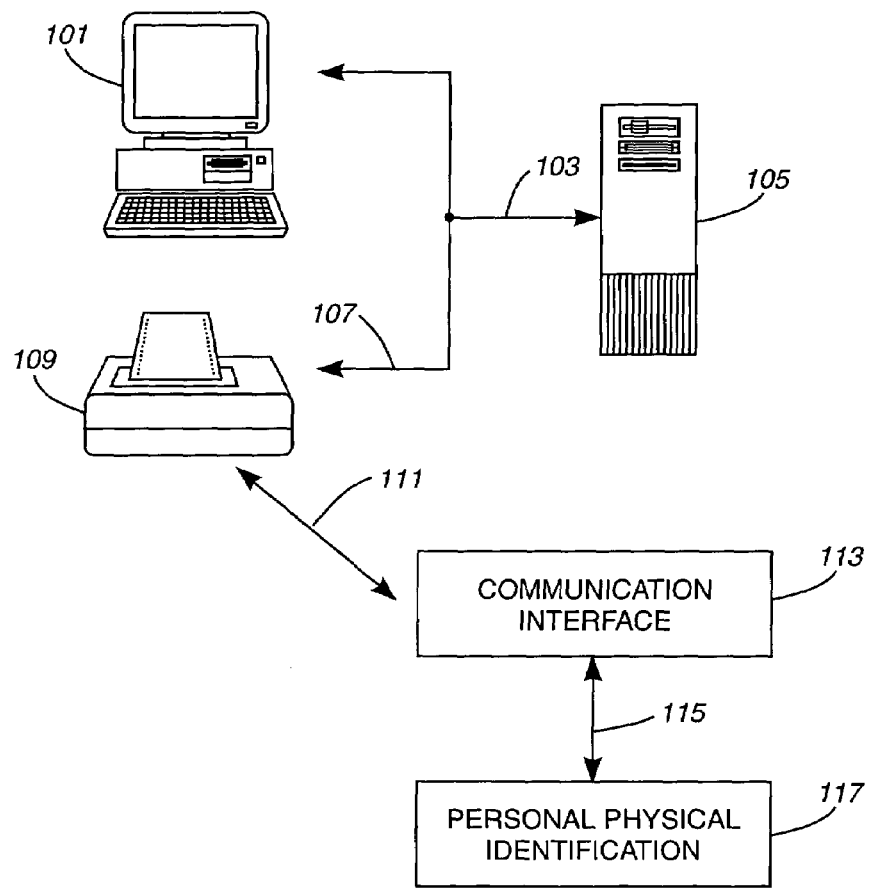
FIG. 1 shows a schematic of a computer system according to an embodiment of the invention.

Referring to FIG. 1, a computer system used in connection with an embodiment of the invention is shown. A client computer 101 is connected to an output device control server 105 through a bidirectional data link 103. The output device control server 105 is connected through a bidirectional data link 107 to an output device 109. The output device 109 may take the form of printer, FAX machine, memory medium write device, display screen, or any other kind or type of device, capable of receiving information, storing the information, and then displaying the information in a temporary display or in a human readable printed version, and as would be known to those skilled in the art, presently or as may be developed.

The output device 109 is connected by a bidirectional data link 111 to a communication interface 113. The communication interface 113, can be temporarily coupled to a personal physical identification device 117 in order to receive data therefrom though a temporary bidirectional data link 115.

In another embodiment, the function of the server 105 is combined with the output device 109 into a single output device with local storage for holding file data for later output.

The bidirectional data links shown in FIG. 1: 103, 107, 111, 115 may use a variety of different protocols. Some of the data links may comprise a local area network (LAN), operating on Ethernet protocol for example, whereas one or more of the bidirectional data links may be external to, yet connected with the LAN. For example, in the case of a remote client computer 101, parts of the bidirectional data link 103 may comprise parts of the Internet communication infrastructure, leased line, or parts of the public telephone system, including wireless systems. The communication protocols used in different layers of the communication protocol stack can also vary.

In the case that the output device 109, is a printer or a FAX machine, the communication protocol used is advantageously a bidirectional communication protocol such as the Internet Printing Protocol (IPP), the Internet FAX (IFAX), or the Intelligent Printer Data Stream (IPDS). These protocols could be extended to handle the new identifying data according to the inventive principles of the invention, or another extensible communications protocol may be employed.

The data link 111 between the output device 109 and the communication interface 113, in one embodiment, comprises a serial port adapter or a parallel port adapter for example. The output control device in one embodiment is a micro-controller (i.e. microprocessor with associated memory and input/output (I/O) interface) integrated into a so-called "smart" printer.

Figure 2:
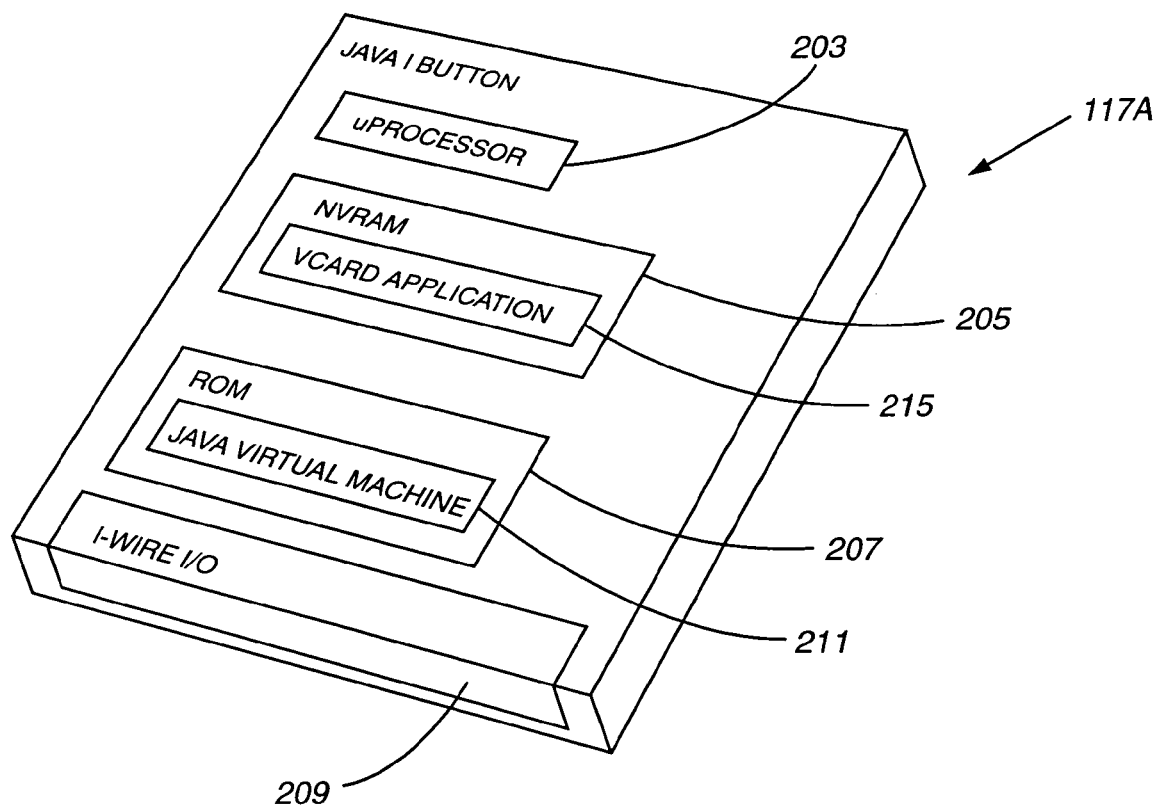
FIG. 2 shows a schematic of a smart card used in connection with an embodiment of the invention.

Referring to FIG. 2, the personal physical identification 117 is shown in the form of a smart card 117A incorporating a Java enabled ibutton®. The smart card 117A is a card-sized device comprising a microprocessor, Read Only Memory (ROM), Random Access Memory (RAM) and an I/O means used for business and financial communication. An ibutton is a tamper proof secure microprocessor/memory device made by Dallas Semiconductor of Dallas, Tex. which is suitable for use in the smart card shown in FIG. 2. A Java™ enabled ibutton is an ibutton loaded with a form of a Java Virtual Machine 211. The Java Virtual Machine 211 is a collection of software routines that are written for a particular processor architecture, providing a standardized interface to the underlying architecture for programs written in the Java language. The Java programming language is a product of Sun Microsystems of Palo Alto, Calif. The smart card 117A comprises a microprocessor 203, Non-Volatile RAM (NVRAM) 205, ROM 207, and a 1-wire® I/O interface 209. The 1-wire I/O bus is a standard developed by Dallas Semiconductor. Computer code embodying the Java Virtual Machine 211 is stored in ROM 207. A VCARD™ application program 215 is stored in the NVRAM 205. In the case of an ibutton smart card, the communication interface 123 would take the form of Blue Dot™ interfaces. The Blue Dot interface has one 1-wire I/O port for connecting to the ibutton, and one serial or parallel port for connection to the output device 109. The Blue Dot interface is a product of Dallas Semiconductor.

Although a smart card has been shown in FIG. 2, it may be desirable to incorporate the functional components described in connection with FIG. 2 into a different type of article, more convenient and personal to the user such as a Radio Frequency ID (RFID), Java Ring or other portable device. For example a Java Ring is a ring that can be worn by a user and incorporates a Java Enabled iButton such as discussed in connection with FIG. 2. A Java enabled ibutton could also be incorporated into a key chain.

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Figure 3:
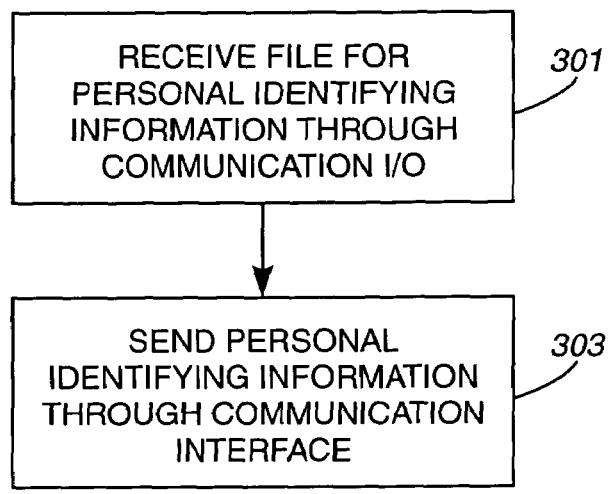
FIG. 3 is a flow diagram of a program executed by the smart card shown in FIG. 2.

Referring to FIG. 3, a flow diagram of the VCARD application program 215 is shown. In the first block 301, a request for personal identifying information is received through the 1-wire I/O. In the second block 303, personal identifying information is sent out through the 1-wire I/O. The information is preferably in a VCARD format. The VCARD format is defined by a standard for presenting personal identifying information supported by the Versit Consortium, an industry group. The VCARD format provides a standardized format for communicating a variety of non confidential information about a person, including, but not limited to, such information as would be contained on a printed business card. Some data items that may be included according to the standard are the persons named in various formats, addresses, different phone numbers along with indications of what they are (e.g., fax, work). According to the VCARD format standard, non-character data, for example, an audio file giving the pronunciation of the user's name or a graphic file containing a picture of the user, may also be included. In order to include non-character data in the VCARD, it is character encoded. One standard for character encoding is called Base64 encoding. Base64 encoding converts each consecutive group of six bits into a character specified in a table given by the standard. The VCARD data is formatted along with field names, and data format indicating information. Certain data items may be included by reference to a universal resource identifier (URI) contained in the VCARD in lieu of the data itself. The VCARD specification, copyrighted in 1996 may be found on the Internet at: http://www.imc.org/pdi/vcard-21.txt, and is hereby incorporated herein by reference in its entirety. The VCARD specification is open in that it allows for additional fields of information to be included according to the design of the implementation. In another embodiment of the invention, the identifying data may be combined with data indicative of the time or place of data access.

Figure 4:
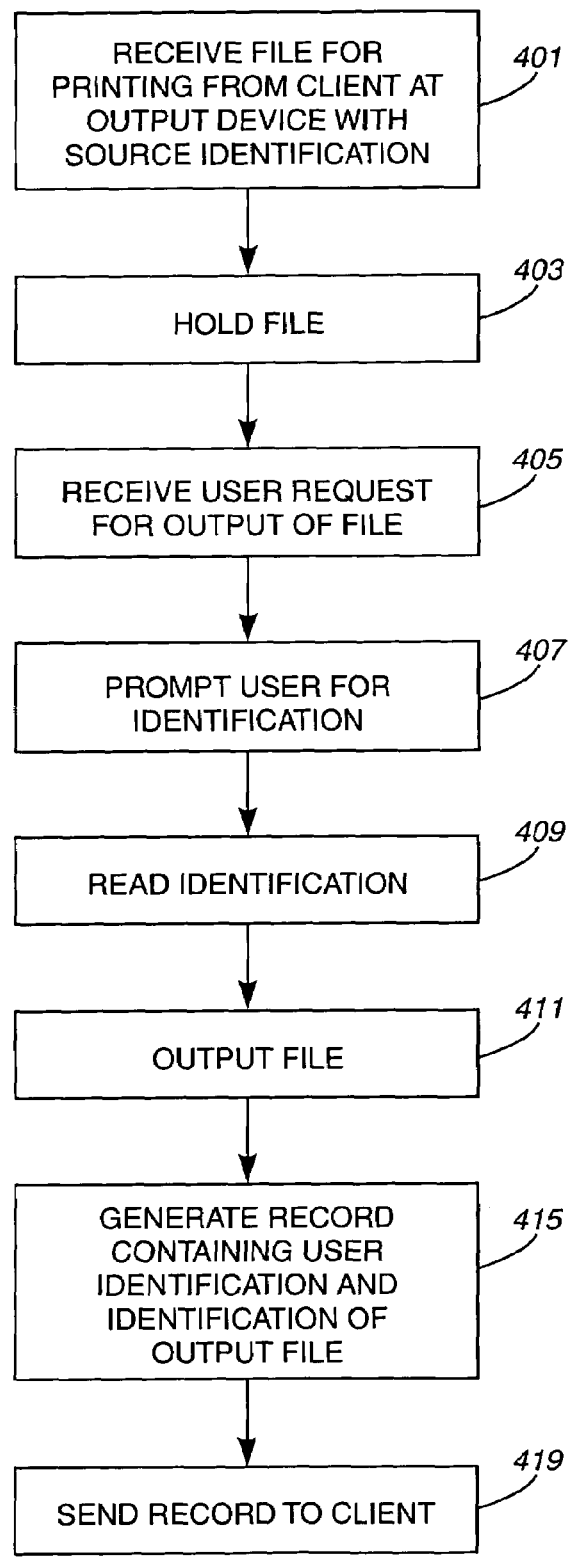
FIG. 4 is a flow diagram of a process for obtaining personal identification information from a person receiving a file output.

FIG. 4 depicts a flow diagram according to an embodiment of the invention from the perspective of the output device control server 105, shown in FIG. 1. In process block 401, a file is received for outputting from the client computer 101, at the output device control server 105. The file is sent along with information identifying its source (e.g., a network address and/or sending party's personal identification (e.g., information including an email address). In the next process block 403, the file is held in the output device control server 105. In the next process block 405, a user's request for outputting the file is received, e.g., via a graphical user interface of the output device control server 105. In the next process block, 407 the user is prompted to present physical identification. In the next process block 409, personal physical identification is read.

It is important to note, that in another embodiment, the process blocks 405 and 407 are optional and the output file is held at the output device 109 locally, rather than requesting the file from the server 105.

In the case of a smart card 117A, the user will insert the smart card 117A, into communication interface 113. A signal requesting personal identifying information is then sent to the Smart Card 117A, and the Smart Card 117A carries out the flow diagram depicted in FIG. 3. The file is then sent in block 411 through output device 109.

Figure 6:
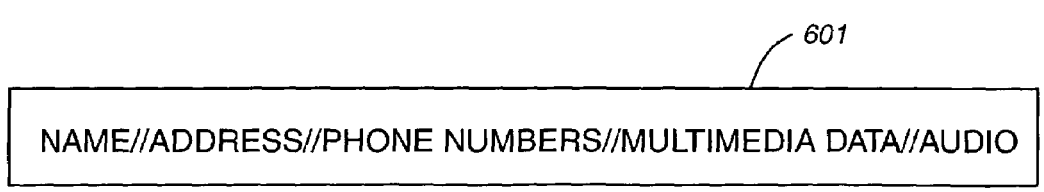
FIG. 6 is a schematic of a VCARD and, in particular, the information which may be contained on a the VCARD to identify the bearer of the VCARD and which may be used in the output device of FIG. 1.

The system and the method according to the disclosed inventive principles may be used, for example, within the VCARD format. A VCARD is schematically represented in FIG. 6. Such information is typically limited to general information such as, name, all relevant addresses and phone numbers, all relevant multimedia data and audio data, without regard to authentication of the identity of the party accessing the document from the output device 109 of FIG. 1, such as by encryption or passwords or special codes, as is common with prior art systems, methods and devices.

In the process block 415, a record is generated which comprises information regarding the file (e.g. a filename, creation date) and personal identifying information obtained from the personal physical identification 117 of the user received in process block 409. As discussed above in connection with FIG. 2, the personal physical identification could be a smart card 117A which sends personal identifying information (in step 303, FIG. 3) through the communication interface 113 to the output device 109. The record is then sent from the output device control server 105, back to the source of the file which is known from the information identifying the source sent along with the file. The record may be sent directly back to a specific computer specified by a network address, or the record may be sent back to a user via an email system depending on format used to identify the source.

In the embodiment where the output device 109 and the output device control server 105 are not combined in one integrated unit, the personal identification is sent from the output device 109 to the server 105 via link 107.

The invention provides an electronic return receipt, that is, it provides the sender of the file with personal identifying information of the person who accepted the output. The intended recipient may be the sender, e.g., in the case where the sender sends a confidential print job to a networked group printer, or a second person with whom the sender intends to communicate.

Figure 5:
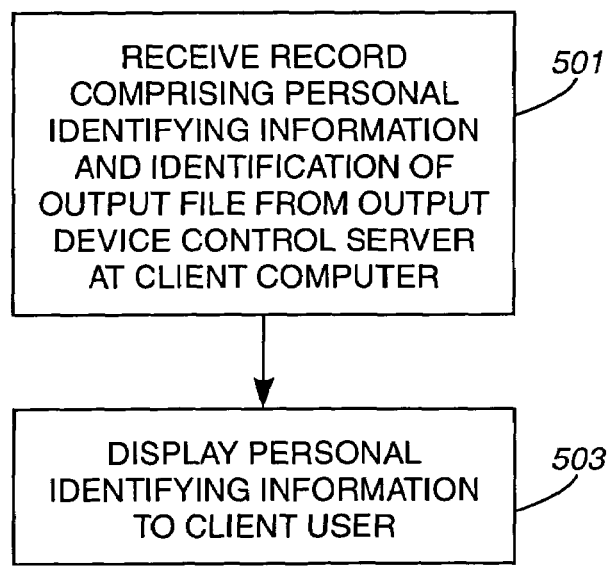
FIG. 5 is a flow diagram of a process for displaying personal identification information.

Referring to FIG. 5, a flow diagram of a process that runs on client computer 101 is shown. In the first process block 501, the record sent in process block 419 from the output device control server 105, comprising personal identifying information and identification of the output file is received at the client computer 101. In the next process block 503, the personal identifying information is displayed on a display device (not shown) associated with the client computer 101. The information may be displayed in association with the name of the output file. For example, in the case of printer type output device 109, the information may be displayed in a dialog box on a display screen of the client computer 101, generated by a print manager program running on the client computer 101.

In still another embodiment, where the output device 109 is a printer that includes an error-knowledgeable system, such as IBM's industry standard IPDS, the information sent back from the output device 109 to client computer 101 could include a report of any errors encountered while printing and how many pages actually printed.

The client computer 101 and the output device control computer 105 may, for example, comprise a microprocessor-based system running a suitable operating system. Operating systems include DOS, Windows 3.1/95/98/NT®, Linux®, Unix®, Macintosh®, and OS/2®. The client computer 101 and the output device control computer 105 may comprise a microprocessor; a basic input output system ROM; RAM; hard disks; removable media drive, e.g., a compact disk ROM drive and a 3.5 inch floppy disk drive; a communication device, e.g. a network card and a modem; a monitor; a video driver board; and a keyboard.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for retrieving a document and for transmitting back, the identifying data of a party accessing or making a copy of the document transmitted through a two-way telecommunications system, comprising the steps of:

transmitting a document from a system device through a two-way communications system to an address of a presentation device using one bidirectional communications protocol;

storing said document in said presentation device;

as a first step in accessing a copy of said document, inputting at said presentation device; identifying data indicative of the identification of a party accessing the document, wherein said identifying data is in a VCARD format;

as a second step in accessing a copy of said document, without authentication and directly responsive to receiving said identifying data, producing a print command;

producing a copy of said document in direct response to said print command;

producing a record of said identifying data used to produce said print command; and transmitting said record through said two-way communications system using said one bidirectional communications protocol, wherein said one bidirectional communications protocol comprises one of an Internet Printing Protocol (IPP), an Internet FAX (IFAX) protocol and an Intelligent Printer Data Stream (IPDS).

2. A computer readable media comprising programming instructions for performing the method of retrieving a document and for transmitting back, the identifying data of a party accessing or making a copy of the document transmitted through a two-way telecommunications system, the computer readable media comprising the programming instructions of:

transmitting a document from a system through a two-way communications system to an address of a presentation device, using one bidirectional communications protocol;

storing said document in said presentation device;

as a first step in accessing a copy of said document, inputting at said presentation device, identifying data indicative of the identification of a party accessing the document, wherein said identifying data is in a VCARD format;

as a second step in accessing a copy of said document, without authentication and directly responsive to receiving said identifying data, producing a print command;

producing a copy of said document, in direct response to said print command;

producing a record of said identifying data used to produce said print command; and transmitting said record through said two-way communications system using said one bidirectional communications protocol, wherein said one bidirectional communications protocol comprises one of an Internet Printing Protocol (IPP), an Internet FAX (IFAX) protocol and an Intelligent Printer Data Stream (IPDS).

3. A device for notifying, through a two-way communications system, a designated part of remote output by a recipient, the device comprising:

an address;

a receiver for receiver a file from a remote system sent to the address;

an input for entering identification information of a user receiving the file from the receiver, wherein said identification information is in a VCARD format;

an output for sending the file to an output device as a direct response to the entry of the identification data and without authentication, using one bidirectional communications protocol; and a transmitter for sending, through said two-way communications system, a notification of the output of the file to the output device and the identification information of the user to at least one designated party, using said one bidirectional communications protocol, wherein said one bidirectional communications protocol comprises one of an Internet Printing Protocol (IPP), an Internet FAX (IFAX) protocol and an Intelligent Printer Data Stream (IPDS).

4. The method of claim 1, wherein said steps of producing a record and transmitting said record includes the step of producing and transmitting a record of at least one of a time, a date, and a location of access to data.

5. The device of claim 3, wherein the at least one designated party is a party sending the file to one address of the device from the remote system.

6. The device of claim 3, wherein the file comprises data identifying the at least one designated party.

7. The device of claim 3, wherein the notification includes at least one of a date the file is sent to the output device, a time the file is sent to the output device, and a location of the output device where the file is sent.

8. The device of claim 3, wherein the input is at least one of a smart card reader, an ibutton reader, a radio frequency ID reader, and a java ring reader.

9. The method of claim 4, wherein said steps of producing a record and transmitting said record includes the step of producing and transmitting a record of personal identifying information of the person who accepted the output.

10. The method of claim 9, wherein said steps of producing a record and transmitting said record includes the step of producing and transmitting a record of a name of the person who accepted the output.

11. The method of claim 1, wherein said step of producing said print command includes the step of producing said print command in direct response to receiving said data in said predetermined format.

12. The method of claim 1, wherein said steps of producing a record and transmitting said record includes the step of producing and transmitting a record of personal identifying information of the person who accepted the output.

13. The method of claim 12, wherein said steps of producing a record and transmitting said record includes the step of producing and transmitting a record of a name of the person who accepted the output.

14. The computer readable media of claim 2, wherein said record of said identifying data used to produce said print command includes a name of the party accessing the document.

* * * * *